United States Patent
Babitch et al.

(10) Patent No.: US 9,277,515 B2
(45) Date of Patent: Mar. 1, 2016

(54) PRECISE TIME TAGGING OF EVENTS OVER AN IMPRECISE LINK

(71) Applicant: Samsung Electronics Co., Ltd., Gyeonggi-do (KR)

(72) Inventors: Daniel Babitch, San Jose, CA (US); Henry Falk, Long Beach, CA (US)

(73) Assignee: Samsung Electronics Co., Ltd (KR)

( * ) Notice: Subject to any disclaimer, the term of this patent is extended or adjusted under 35 U.S.C. 154(b) by 33 days.

(21) Appl. No.: 14/335,437

(22) Filed: Jul. 18, 2014

(65) Prior Publication Data

US 2015/0124797 A1 May 7, 2015

Related U.S. Application Data

(60) Provisional application No. 61/899,559, filed on Nov. 4, 2013.

(51) Int. Cl.
*H04W 56/00* (2009.01)
*G06F 13/38* (2006.01)
*G06F 1/04* (2006.01)
*H04J 3/06* (2006.01)

(52) U.S. Cl.
CPC .............. *H04W 56/001* (2013.01); *G06F 1/04* (2013.01); *G06F 13/38* (2013.01); *H04J 3/0697* (2013.01); *H04J 3/0644* (2013.01)

(58) Field of Classification Search
None
See application file for complete search history.

(56) References Cited

U.S. PATENT DOCUMENTS

| | | | |
|---|---|---|---|
| 5,041,833 A | 8/1991 | Weinberg | |
| 5,650,981 A | 7/1997 | Jacobsen et al. | |
| 5,682,328 A | 10/1997 | Roeber et al. | |
| 6,415,325 B1 * | 7/2002 | Morrien | H04J 3/0602 709/218 |
| 7,593,738 B2 | 9/2009 | Anderson | |
| 2002/0105933 A1 * | 8/2002 | Higuchi | H04B 7/269 370/338 |
| 2013/0018620 A1 | 1/2013 | Riendeau et al. | |
| 2015/0163003 A1 * | 6/2015 | Takahashi | H04J 3/0667 370/509 |

* cited by examiner

*Primary Examiner* — Hoon J Chung
(74) *Attorney, Agent, or Firm* — The Farrell Law Firm, P.C.

(57) ABSTRACT

A system for precise timing and synchronization of events is provided. The system includes a first terminal including one or more first counters and a packetizer configured to create a packetized data stream having one or more event tags. The system also includes a second terminal that includes one or more second counters and a depacketizer. The second counter(s) is/are configured to count clock pulses generated by a first clock of the first terminal at a first clock rate. The depacketizer is configured to receive the packetized data stream and detect the event tag(s). When the at least one event tag is detected, the second terminal calculates a time at which the first terminal created the packetized data stream based on a count value of the second counter(s) and a count value of the first counter(s) of the first terminal.

20 Claims, 4 Drawing Sheets

PRECISE TIME TAGGING OF EVENTS OVER AN IMPRECISE LINK

PRIORITY

This application claims priority under 35 U.S.C. §119(e) to U.S. Provisional Patent Application Ser. No. 61/899,559, which was filed in the U.S. Patent and Trademark Office on Nov. 4, 2013, the entire disclosure of which is incorporated herein by reference.

BACKGROUND OF THE INVENTION

1. Field of the Invention

The present invention relates generally to precise time tagging of events over an imprecise link between two devices/terminals and, more particularly, to precise time tagging of events over an imprecise link between two chips which are not synchronized.

2. Description of the Related Art

The precise timing and synchronization of events over an imprecise link between two devices/terminals is a universal and scalable problem.

For example, in radio communication systems, e.g., Global Navigational Satellite Systems (GNSSs), upon reception of a broadcast radio signal, a receiver e.g., a GNSS receiver, attempts to accurately extract information from the received signal by performing an appropriate demodulation technique.

Typically, the GNSS receiver will include a front end having one or more terminals or chips that are configured to perform an initial step of the demodulation process of the received signal. For example, the front end of the GNSS receiver may include a radio frequency (RF) peripheral chip including a packetizer which packs data of the received signal into packets with a specific format, e.g., a data stream, and then transmits the packetized data to an appropriate interface that can receive and transmit packetized data. The interface may be another terminal of the front end or another chip, e.g., a digital host chip including a depacketizer.

During the demodulation process, it may be necessary for the digital host chip to identify when a change in status of the data stream occurs in the RF peripheral chip. Unfortunately, however, because there is a delay from the RF peripheral chip to the digital host chip and from digital host chip to RF peripheral chip, as these chips are typically not synchronized with one another (i.e., the internal clocks of these chips are not locked to each other) it is often difficult for the digital host chip to identify when such a change in the data stream occurs. This can decrease the efficacy in which the GNSS receiver can demodulate the received signal.

As can be appreciated, such problems can affect other types of wireless communication systems, e.g., Wi-Fi, that require precise timing and synchronization of events over an imprecise link between two devices/terminals.

Thus, there is a need for methods and systems for precise timing and synchronization of events over an imprecise link between two devices/terminals.

SUMMARY OF THE INVENTION

The present invention has been made to address the above problems and disadvantages, and to provide at least the advantages described below. Accordingly, an aspect of the present invention, which may prove useful in the related arts, is to provide precise time tagging of events over an imprecise link between two chips which are not synchronized (i.e., the internal clocks of these chips are not locked to each other).

In accordance with an aspect of the present invention, there is provided a system for precise timing and synchronization of events. A first terminal includes one or more first counters and a packetizer configured to create a packetized data stream having one or more event tags. A second terminal includes one or more second counters and a depacketizer. The second counter(s) is/are configured to count clock pulses generated by a first clock of the first terminal at a first clock rate. The depacketizer is configured to receive the packetized data stream and detect the event tag(s). When the at least one event tag is detected, the second terminal calculates a time at which the first terminal created the packetized data stream based on a count value of the second counter(s) and a count value of the first counter(s) of the first terminal.

In accordance with another aspect of the present invention, there is provided a method for precise timing and synchronization of events. An event tag request is sent from a second terminal to a first terminal. A packetized data stream including an event tag is created at the first terminal. The packetized data stream is sent to the second terminal. Clock pulses are counted with a second counter of the second terminal. The clock pulses are generated at a first clock rate by a first clock of the first terminal. The event tag is detected at the second terminal. When at least one event tag is detected, a time at which the first terminal created the packetized data stream is calculated. This calculation is based on a count value of the second counter and a count value of a first counter of the first terminal.

BRIEF DESCRIPTION OF THE DRAWINGS

The above and other aspects, features, and advantages of certain embodiments of the present invention will be more apparent from the following detailed description taken in conjunction with the accompanying drawings, in which.

DETAILED DESCRIPTION OF EMBODIMENTS OF THE PRESENT INVENTION

Various embodiments of the present invention will now be described in detail with reference to the accompanying drawings. In the following description, specific details such as detailed configuration and components are merely provided to assist in the overall understanding of these embodiments of the present invention. Therefore, it should be apparent to those skilled in the art that various changes and modifications of the embodiments described herein can be made without departing from the scope and spirit of the present invention. In addition, descriptions of well-known functions and constructions are omitted for clarity and conciseness.

As noted above, precise time tagging of events over an imprecise link between two chips which are not synchronized may prove useful in the related arts, and such precise time tagging of events is herein described.

Embodiments of this invention provide a solution for a class of problems concerning precise timing between devices/components, and, more particularly, precise event time tagging and time transfer. Embodiments of the present invention provide a system and a method for a first terminal to add tags to events and for a second terminal to determine precisely when those events happened.

For illustrative purposes, the first and second terminals are assumed to be components of a GNSS receiver that is configured to communicate with one or more GNSS satellites.

Figure 1:
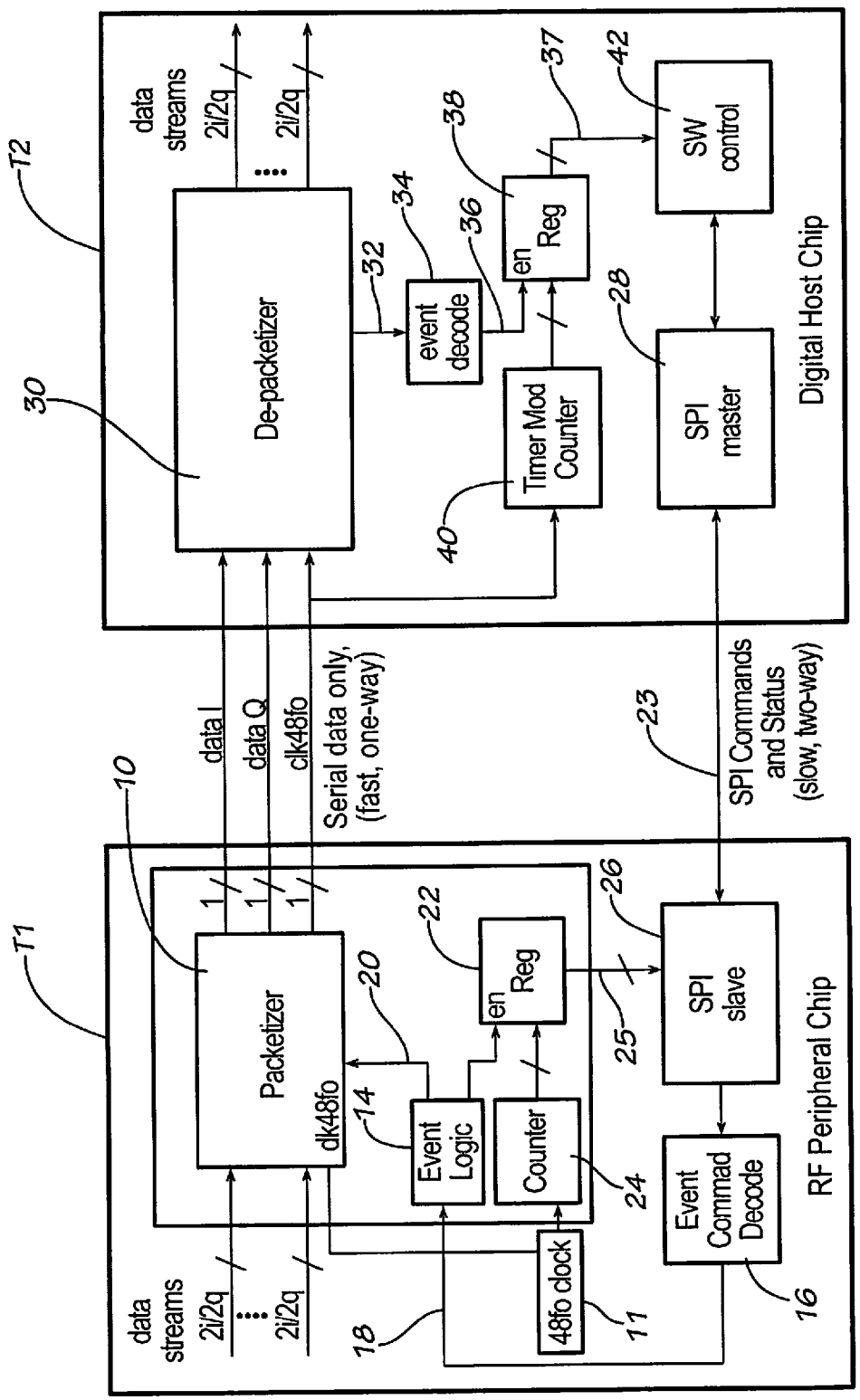
FIG. 1 is a diagram of a wired link between an RF peripheral chip and a digital host chip, according to an embodiment of the present invention.

FIG. 1 is a diagram of a wired link between a first terminal, e.g., an RF peripheral chip, (terminal T1) and a second terminal, e.g., a digital host chip, (terminal T2), according to an embodiment of the present invention. Shown in FIG. 1 are only small portions of the first and second terminals T1 and T2, i.e., only the areas directly pertinent to the embodiments of the present invention.

The terminal T1 receives signals from multiple GNSS satellites, processes them, and passes them in a serial packetized data stream to the terminal T2. For illustrative purposes, the GNSS satellites are assumed to be associated with the Global Positioning System (GPS), Galileo GNSS, Glonass GNSS and Beidou GNSS.

The terminal T1 includes a packetizer 10 that is configured to receive data streams carried on RF signals received from the multiple GNSSs. The packetizer 10 creates packetized serial data streams data I (in-phase detection channel) and data Q (quadrature-phase detection channel), at least one of which having at least one event tag 12 (see FIGS. 2 and 3) embedded thereon. The event tag 12 is used to determine alignment between a counter 24 of the terminal T1 relative to a Time Modulation counter 40 of the terminal T2, thereby allowing the terminals T1, T2 to be synched to each other (i.e., locking the internal clocks of the terminals T1, T2 to each other), as will described below. In the illustrated embodiment, the packetizer 10 embeds the at least one event tag 12 on the data Q data stream at an $E_0$ bit position (or one of the $F_1$, $F_3$, $F_5$ bit positions) on the data stream data Q. For illustrative purposes, the $E_0$ bit position is shown corresponding to an event S bit position on the data stream data I (FIGS. 2 and 3), as described in detail below. Alternatively, the packetizer 10 can embed the at least one event tag 12 on the data stream data I, such as at one of the $F_0$, $F_2$, $F_4$ bit positions. In embodiments, the data stream data Q can include the event S instead of the data stream data I.

In accordance with the embodiments of the present invention, the event S bit position, which is always equal to 1, signifies the start of a frame on the data streams data I and data Q. The frame shows a period over which the structure of the data streams data I and data Q repeat. The structure consists of some event flags, e.g., bit positions $E_0$ and $F_0$-$F_5$ (may be defined as either 1 or 0), and some packets. These structures have fixed lengths, i.e., a fixed number of bits for each packet or event flag; the structure also has a fixed sequence which does not change.

In accordance with the embodiments of the present invention, the terminal T1 uses the event S bit position to identify a sequence of event flags and packets and to determine the alignment of the packets. That is, when the event S bit position is identified by the terminal T2, the terminal T2 can determine where the event flags, e.g., bit positions $E_0$ and $F_0$-$F_5$, and packets are and when they repeat, thereby allowing the terminal T2 to determine when the $E_0$ is embedded with the event tag 12, i.e., when the $E_0$ is set to 1.

In embodiments of the present invention, to determine where the event flags are, the terminal T2 sends a command signal to the terminal T1 to force the bits, e.g., the $E_0$ and $F_0$-$F_5$ bits, other than the event S bit position, to zero for a few frames. At the same time the terminal T2 enables an event decode module 34 which is programmed to detect the event bit position S, i.e., the only bit that is equal to 1. Once the terminal T2 determines the event bit position S, e.g., after a single frame, the terminal T2 can then determine bit positions $E_0$ and $F_0$-$F_5$. In accordance with embodiments of the present invention, the terminal T2 can determine the event bit position S after a repetition of frames, e.g., after two or more frames. The terminal T2 then sends a command to the terminal T1 to return normal signals and flags, i.e., some of the $E_0$ and $F_0$-$F_5$ bits to zero or one. Once the terminal T2 knows the event bit position S and the bit positions $E_0$ and $F_0$-$F_5$, the terminal T2 can lock a time value (e.g., count value of the Time Modulation counter 40) for the event bit position S and the event flag 12, as will be described below.

Continuing with reference to FIG. 1, the packetizer 10 receives a clock signal from a $48f_o$ processing clock 11. The packetizer 10 outputs the serial data streams data Q and data I at a first clock rate equal to a $48f_o$ bit rate, i.e., the frequency $f_o$ is equal to a bit rate of 1.023 Mbits/sec.

Figure 2:
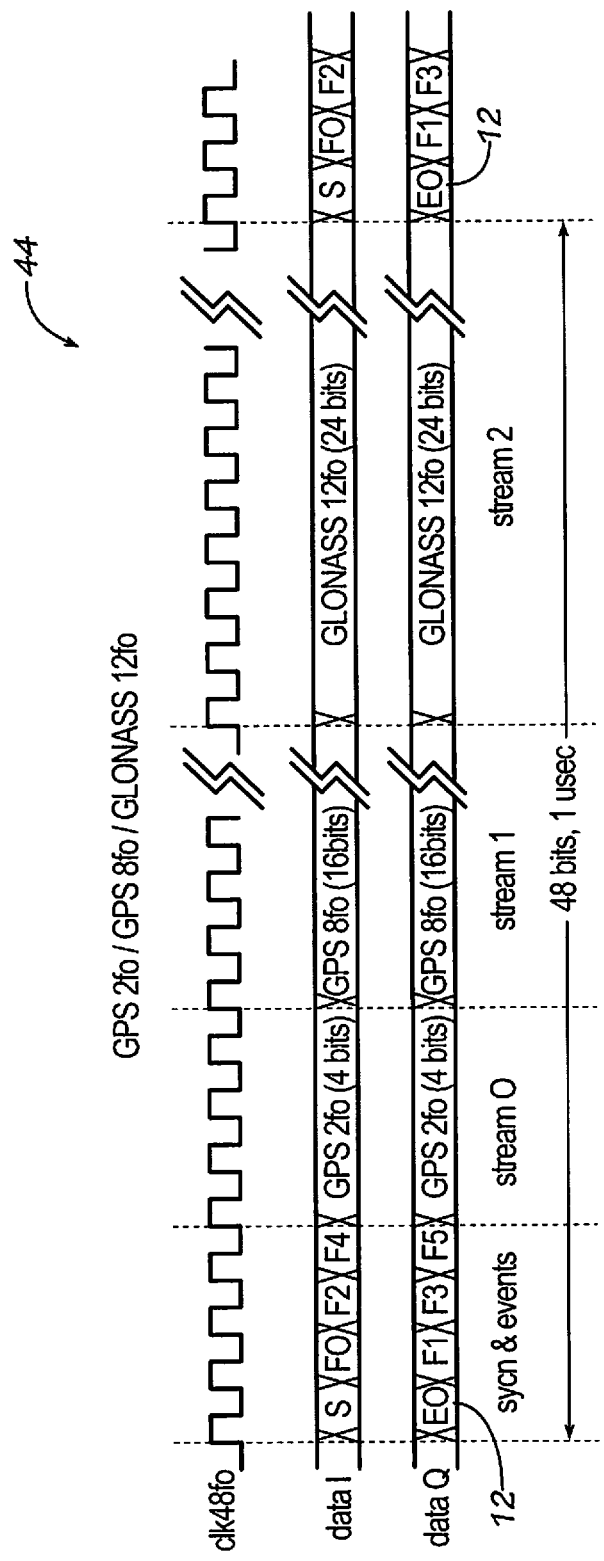
FIGS. 2 and 3 are diagrams illustrating packet structures of serial data streams from the RF chip to the digital host chip shown in FIG. 1, according to an embodiment of the present invention.

The terminal T1 includes an event logic module 14 that receives an event command decode signal 18 from an event command decode module 16. The event logic module 14 converts the event command decode signal 18 to an event logic signal 20 and sends the event logic signal 20 that contains the information relating to the at least one event tag 12 to the packetizer 10 so that the packetizer 10 can embed the data Q data stream with the at least one event tag 12 (FIG. 2).

The event logic module 14 sends an output signal to an enable pin of a register 22 of the terminal T1. The register 22 receives counter information from a counter 24 that receives a clock signal from the $48f_o$ processing clock 11. When the enable pin of the register 22 is enabled, the register 22 sends a signal 25 at the $48f_o$ clock rate to a Serial Peripheral Interface (SPI) slave module 26 of the terminal T1. The signal 25 is the RF time, i.e., the 48fo clock count value from the counter 24, at which the event command decode module 16 receives an event decode request signal 23. The count value is captured in the register 22 and sent over the SPI to the terminal T2 where the terminal T2 can read the count value, thereby allowing the terminal T2 to calculate a time at which the terminal T1 created the packetized data stream with the event tag 12, as will be described below.

The SPI slave module 26 receives an event decode request signal 23 over a bidirectional interface from an SPI master 28 of the terminal T2, processes the event decode request signal 23, and outputs this request to the event command decode module 16, which sends the event command decode signal 18 to the event logic module 14. As can be appreciated, the event command decode module 16 can be omitted and the SPI slave module 26 can send the event command decode signal 18 directly to the event logic module 14.

Continuing with reference to FIG. 1, the terminal T2 includes a depacketizer 30 which receives the packetized data streams data I, data Q and the clock signal from the $48f_o$ processing clock 11. The depacketizer 30 includes the necessary logic circuitry to detect the at least one event tag 12 embedded on the data stream data Q. After the at least one event tag 12 is detected by the depacketizer 30, the depacketizer 30 outputs an event decode signal 32 to the event decode module 34. The depacketizer 30 also outputs the data streams data I and data Q to other components of the terminal T2 for further processing.

When the event decode module 34 receives the event decode signal 32, the event decode module 34 sends an output signal 36 to an enable pin of a register 38 of the terminal T2.

The register 38 receives counter information from the timer modulation counter 40 that receives a clock signal from the 48$f_o$ processing clock 11. When the enable pin of the register 38 is enabled, the register 38 captures the exact count value (e.g., the 48fo clock count value on the signal 25 received from the terminal T1) present when the event decode request signal 23 was sent to the event command decode module 16 and sends a signal 37 to a software control module 42, which is in bidirectional communication with the SPI master 28. The signal 37 includes the count value of the counter 40 which can be read and compared, by the software control module 42, to the count value on the signal 25 which was captured by the terminal T1.

Figure 3:
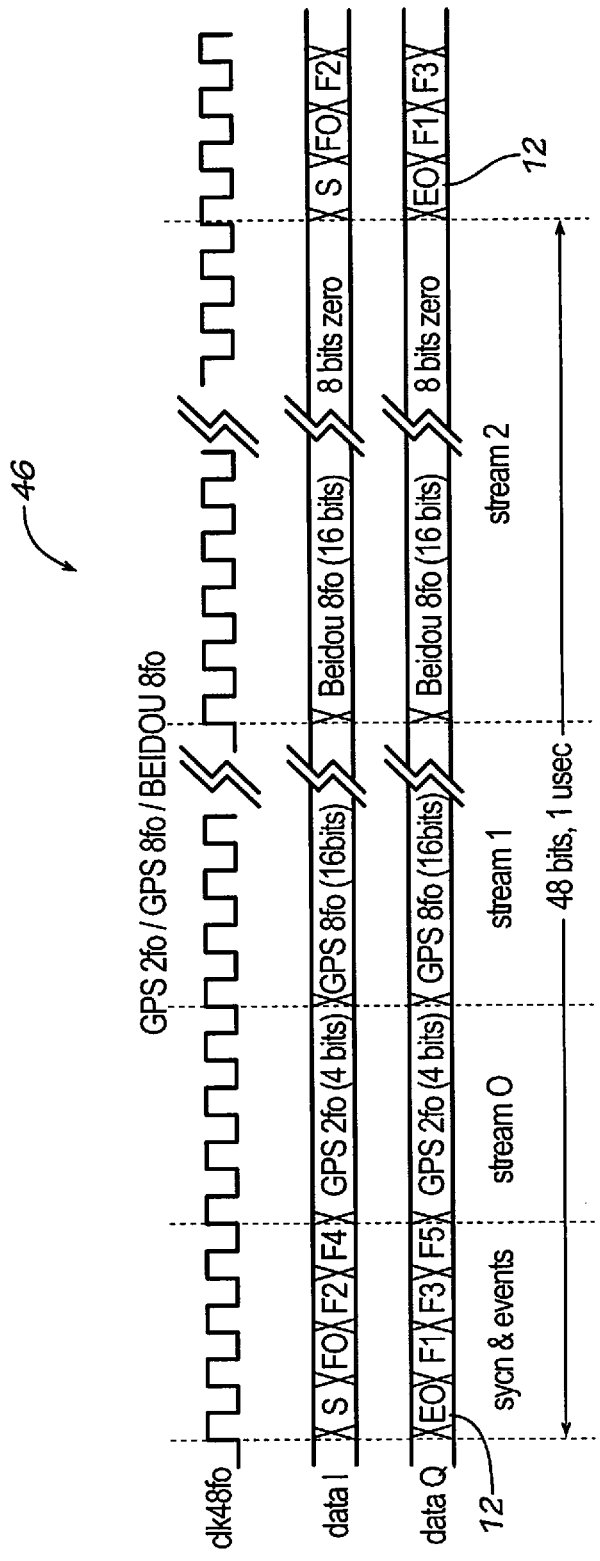

FIGS. 2 and 3 show the packet structure 44, 46, respectively, of the serial data streams data Q and data I from the terminal T1 to the terminal T2, in accordance with embodiments of the present invention. In FIG. 2, the packet structure 44 is associated with RF signals received by the terminal T1 from the GPS, Galileo, and GLONASS, whereas in FIG. 3, the packet structure 46 is associated with RF signals received by the terminal T1 from the GPS, Galileo, and Beidou. In these specific embodiments, the GPS and Galileo signals are still combined at this part of the reception chain, and thus Galileo does not appear separately from the GPS streams.

In accordance with the embodiments of the present invention, a certain bit position in the packet structures 44, 46 are reserved for the at least one event tag 12 and another bit position is reserved for the event S.

Specifically, in FIG. 2, from left (first in time) to right (last in time), the data I includes the event S (e.g., the start bit of the frame), three event flags $F_0$, $F_2$, $F_4$, which can indicate various kinds of events, four bits of low-rate GPS/Galileo data (GPS and Galileo have some signals on the same RF frequency), sixteen bits of high-rate GPS/Galileo data, and twenty four bits of GLONASS data. The data Q has the same bit configuration as the data I, except that the event S is replaced by an event flag, e.g., the event tag 12 at bit position $E_0$.

FIG. 3 is the same packet and flag structure as FIG. 2 except a Beidou signal is substituted for the GLONASS signal of FIG. 2.

Figure 4:
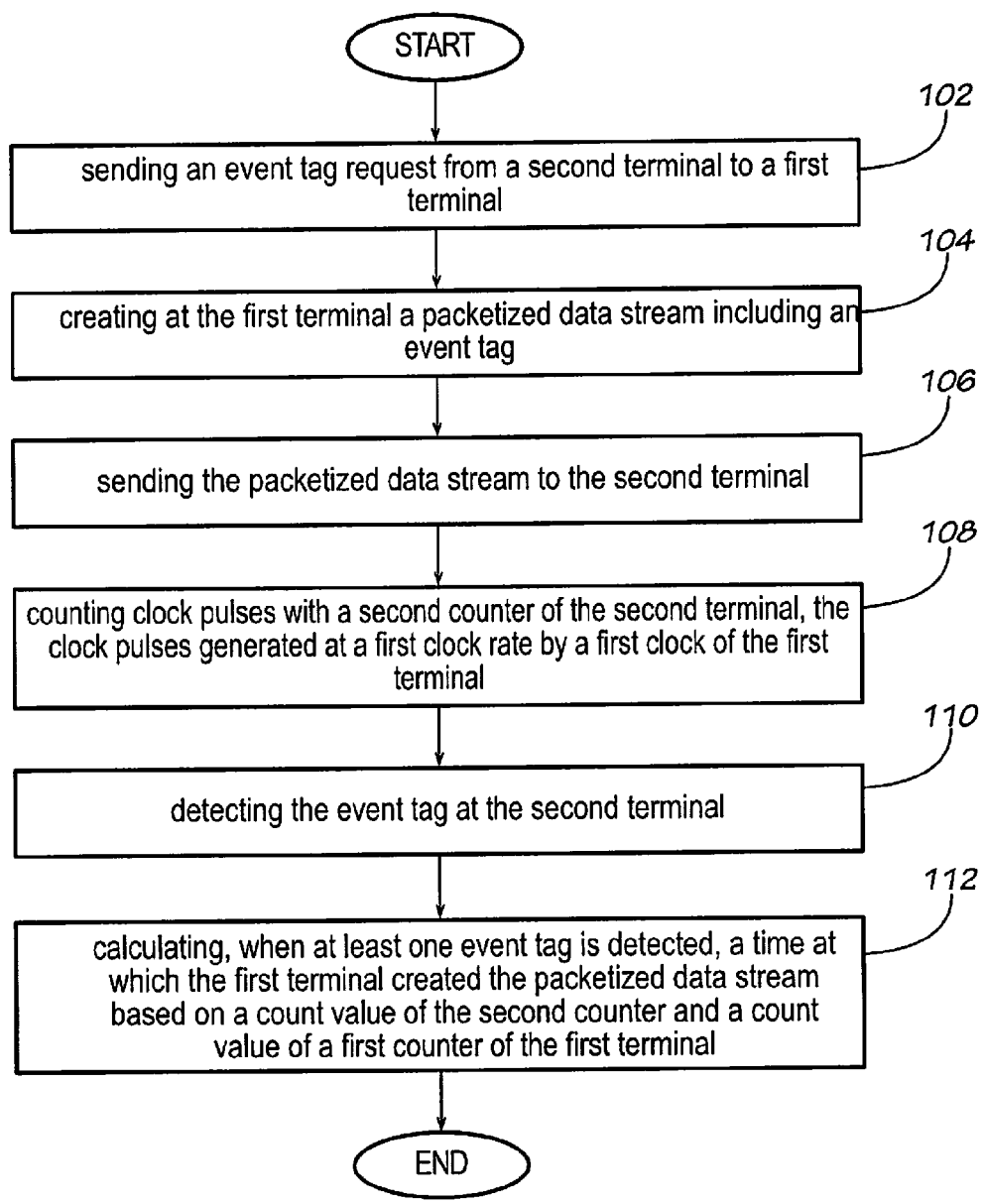
FIG. 4 is a flowchart illustrating a method for precise timing and synchronization of events in the RF peripheral chip and the digital host chip shown in FIG. 1, according to an embodiment of the present invention.

Referring to FIG. 4, a method 100 for precise timing and synchronization of events in terminals T1 and T2 according to the embodiments of the present invention is now described.

At step 102, SPI master 28 of the terminal T2 sends an event decode request 23 to the SPI slave 26, and the terminal T2 simultaneously starts the time modulation counter 40. The time modulation counter 40 counts clock pulses of the 48$f_o$ processing clock 11 coming from the terminal T1. In the embodiments of the present invention, the SPI master 28 may be configured to start the time modulation counter 40. Alternatively, another component, e.g., a processor (not shown), of the terminal T2 may be configured to start the time modulation counter 40.

The SPI slave 26 processes the event decode request signal 23 and outputs this request to the event command decode module 16. The event command decode module 16 sends the event command decode signal 18 to the event logic module 14, which then converts the event command decode signal 18 to an event logic signal 20 and sends the event logic signal 20 to the packetizer 10 so that the packetizer 10 can embed the data Q data stream with the at least one event tag 12, at step 104.

In the embodiments of the present invention, the packetizer 10 embeds the at least one event tag 12 at the $E_0$ bit position on the data stream data Q (FIGS. 2 and 3). Alternatively, the at least one event tag 12 can be embedded at the other bit positions on the data stream data Q. For example, the event tag 12 can be embedded at the $F_1$, $F_3$, $F_5$ bit positions of the data stream data Q, or the event tag 12 can be embedded at the $F_0$, $F_2$, $F_4$ bit positions of the data stream data I.

As noted above, the event S is always equal to one, as this is the frame start bit, and is present on all frames. Conversely, the event tag(s) 12 is/are only present, i.e., set, on the very first frame immediately after the event decode request signal 23 was sent from the terminal T2 was applied. Accordingly, the terminal T2 can determine which bit, e.g., $E_0$ bit with the event tag 12, in the frame was set when the event decode request signal 23 was sent to the event command decode module 16 from terminal T2.

At step 106, the packetizer 10 sends the packetized data stream to the depacketizer 30 of terminal T2.

At step 108, clock pulses generated at the first clock rate by the 48$f_o$ processing clock 11 of the terminal T1 are counted with the second counter 40.

At step 110, the event tag 12 is detected by the depacketizer 30 of the terminal T2.

At step 112, when the at least one event tag 12 is detected, a time at which the terminal T1 created the packetized data stream with the event tag 12 is calculated. More particularly, the software module 42 compares the terminal T2 count value, e.g., provided on the signal 37, which is stored in the register 38, and the terminal T1 count value, e.g., provided on the signal 25, which is stored in the register 22, This calculation may also be performed by the SPI master 28 (or by a controller or processor (not shown)).

The method 100 provides an efficient and reliable process for precise event time tagging and time transfer in the terminals T1 and T2. Accordingly, during a demodulation process, the aforementioned configuration of the terminals T1 and T2 allows the terminal T2 to know at what precise point in the serial data streams data Q and data I a change in status of the streaming data occurred in the terminal T1.

In accordance with another embodiment of the present invention, instead of using counters 24 and 40, which can start and stop, other types of counters can also be used. For example, counters which run continuously are contemplated. Such types of counters have particular utility in embodiments where the at least one event tag 12 is used to capture a counter value into one of the aforementioned registers 22, 38.

In accordance with another embodiment of the present invention, instead of embedding the event tag 12 on the serial data stream data Q, a unique bit sequence, e.g., 1 0 1 (not shown), can be embedded on the serial data stream data Q. In this embodiment, the unique bit sequence can be embedded on one of the serial data streams data Q or data I, in a manner as described above regarding the at least one event tag 12. Thus, for example, since there are seven bit positions (or flags), i.e., $E_0$ and $F_0$-$F_5$, if one flag or bit position is assigned to one event type, then 7 different events can be identified. However, if the bits $E_0$ and $F_0$-$F_5$ are coded via a unique bit sequence, then 2^7 (or 128) different event types can be identified. In such an embodiment, the event decode module 32 may need to be reconfigured to accommodate detection of such a unique bit sequence.

In this embodiment, when the unique bit sequence is detected, a time at which the terminal T1 created the packetized data stream with the unique bit sequence is calculated. This calculation is based on a count value of the second counter 40 and a count value of the first counter 24 of the terminal T1.

While not described in detail above, the $F_0$-$F_5$ bits can be used to accommodate various event schemes. For example, a controller, microprocessor, or the software module 42 of the terminal T2 can be programmed to set one of the $F_0$-$F_5$ bits to alert the terminal T1 of the impending event request, e.g., a delayed tag event 12. Moreover, a controller, microprocessor, or the software 42 can be used to request that parameters in the terminal T2 be latched to be read across the SPI; this mechanism can capture the time of latched data, e.g., an immediate tag event 12. Further, the $F_0$-$F_5$ bits can be used to determine time of transitions in the formatting of the data contained in packets, e.g., switching from Glonass frame formatting to Beidou frame formatting.

Although the illustrated embodiment refers to terminals T1 and T2 that are embodied in a GNSS receiver, embodiments are not so limited. In other embodiments of the present invention, the terminals T1 and T2 can be implemented for use with other Wireless Wide Area Network (WWAN) standards and devices, e.g., WLAN BlueTooth (WLANBT), WLAN Blue-Tooth LowEnergy (WLAN BLE), WiMAX, 3G, 4G, etc.

While the terminals T1 and T2 and method of using the same have been described herein communicating over an SPI non-time precise link, the terminals T1 and T2 and method are not so limited, as the terminals T1 and T2 may be configured to communicate over other non-time precise links.

While the present invention has been particularly shown and described with reference to certain embodiments thereof, it will be understood by those of ordinary skill in the art that various changes in form and details may be made therein without departing from the spirit and scope of the present invention as defined by the following claims and their equivalents.

What is claimed:

1. A system for precise timing and synchronization of events, comprising:
   a first terminal including at least one first counter and a packetizer configured to create a packetized data stream having at least one event tag; and
   a second terminal including at least one second counter and a depacketizer, the at least one second counter configured to count clock pulses generated by a first clock of the first terminal at a first clock rate, the depacketizer configured to receive the packetized data stream and detect the at least one event tag,
   wherein, when the at least one event tag is detected, the second terminal calculates a time at which the first terminal created the packetized data stream based on a count value of the at least one second counter and a count value of the at least one first counter of the first terminal.

2. The system according to claim 1, wherein the second terminal includes at least one serial peripheral interface (SPI) master that outputs an event tag request to at least one SPI slave of the first terminal.

3. The system according to claim 1, wherein the first and second terminals communicate with each other over a wired link interface.

4. The system according to claim 2, wherein the second terminal includes at least one second register that receives an event decode signal from the depacketizer and the count value from the at least one second counter of the second terminal.

5. The system according to claim 4, wherein the second terminal includes at least one software control module that sends a control signal to the SPI master when the count value is received from the at least one second register.

6. The system according to claim 2, wherein the at least one SPI slave sends the event tag request to an event command decoder module that decodes the event tag request and sends a event command decode signal to an event logic module configured to convert the event command decode signal to an event logic signal that is sent to the packetizer of the first terminal and embedded on the packetized data stream event command decode signal.

7. The system according to claim 6, wherein the first terminal further includes at least one first register.

8. The system according to claim 7, wherein the at least one first register receives an event logic signal sent from the event logic module and the count value sent from the at least one first counter of the first terminal, and the at least one first register sends the count value of the first counter to the SPI slave, which sends the first count value of the first counter to the software module of the second terminal.

9. The system according to claim 1, wherein the packetized data stream is created based on a radio frequency (RF) signal received at the first terminal.

10. The system according to claim 1, wherein the at least one first counter is synched to the first clock.

11. The system according to claim 1, wherein the first and second terminals comprise first and second chips.

12. A method for precise timing and synchronization of events, comprising:
   sending an event tag request from a second terminal to a first terminal;
   creating at the first terminal a packetized data stream including an event tag;
   sending the packetized data stream to the second terminal;
   counting clock pulses with a second counter of the second terminal, the clock pulses generated at a first clock rate by a first clock of the first terminal;
   detecting the event tag at the second terminal; and
   calculating, when at least one event tag is detected, a time at which the first terminal created the packetized data stream based on a count value of the second counter and a count value of a first counter of the first terminal.

13. The method according to claim 12, wherein sending the event tag request further includes sending the event tag request from at least one SPI master of the second terminal to at least one SPI slave of the first terminal.

14. The method according to claim 12, wherein the first and second terminals communicate with each other over a wired link interface.

15. The method according to claim 14, further comprising sending an event decode signal from a depacketizer of the second terminal and the count value from the second counter of the second terminal to at least one second register of the second terminal.

16. The method according to claim 15, further comprising sending a control signal from at least one software control module of the second terminal to the SPI master when the count value is received from the at least one second register.

17. The method according to claim 13, further comprising sending the event tag request from the at least one SPI slave to an event command decode module, decoding the event tag request, sending an event command signal to an event logic module configured to convert the event command signal to an event logic signal, sending the event logic to the packetizer of the first terminal, and embedding the event tag within the packetized data stream.

18. The method according to claim 13, further comprising synching the first counter of the first terminal to the first clock.

19. The method according to claim 18, further comprising sending an event logic signal from the event logic module and the count value from the at least one first counter to at least one first register of the first terminal.

20. The method according to claim 19, further comprising outputting the count value from the at least one first register to the SPI slave.

* * * * *